United States Patent [19]

Pan

[11] Patent Number: 5,608,831
[45] Date of Patent: Mar. 4, 1997

[54] FIBER OPTIC COUPLER AND METHOD OF MAKING SAME

[75] Inventor: Jing-Jong Pan, San Jose, Calif.

[73] Assignee: E-Tek Dynamics, Inc., San Jose, Calif.

[21] Appl. No.: 483,024

[22] Filed: Jun. 7, 1995

Related U.S. Application Data

[62] Division of Ser. No. 294,666, Aug. 23, 1994, Pat. No. 5,551,968, which is a division of Ser. No. 159,882, Nov. 30, 1993, Pat. No. 5,371,816, which is a division of Ser. No. 867,651, Apr. 13, 1992, Pat. No. 5,267,340, which is a division of Ser. No. 640,176, Jan. 11, 1991, Pat. No. 5,117, 473, which is a division of Ser. No. 390,795, Aug. 8, 1989, Pat. No. 5,016,963.

[51] Int. Cl.$^6$ .................................................. G02B 6/32
[52] U.S. Cl. .............................. 385/85; 385/33; 385/46
[58] Field of Search ............................... 385/15, 22, 23, 385/33, 34, 46, 85, 115–121

[56] References Cited

U.S. PATENT DOCUMENTS 4,698,084  10/1987  Severijns et al. ................ 350/96.22
5,117,473   5/1992  Pan .................................... 385/33

Primary Examiner—John Ngo
Attorney, Agent, or Firm—Townsend & Townsend & Crew LLP

[57] ABSTRACT

A low-cost, high performance 1×N fiber optic coupler where N>16 is presented. The coupler has a GRIN lens having an first optic fiber aligned with the optical axis of the lens at one end of the lens. The first optic fiber ends in a microlens. At the other end of the GRIN lens a bundle of tapered second optic fibers is centered on the optical axis of the lens.

5 Claims, 4 Drawing Sheets

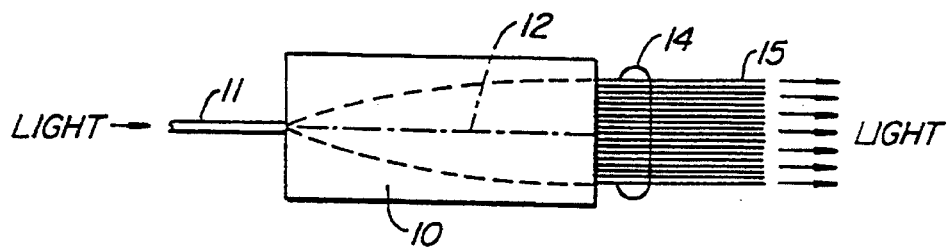
FIG._1.
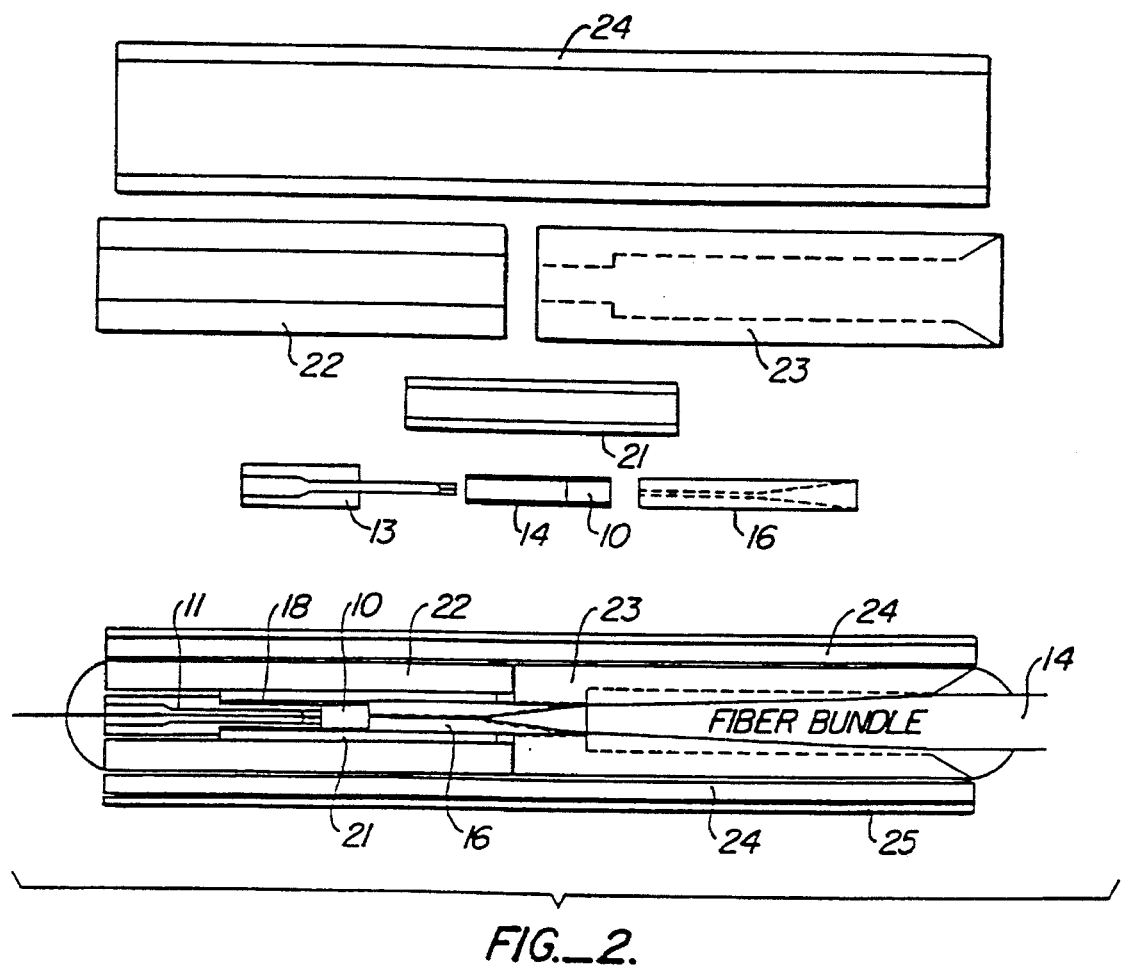
FIG._2.

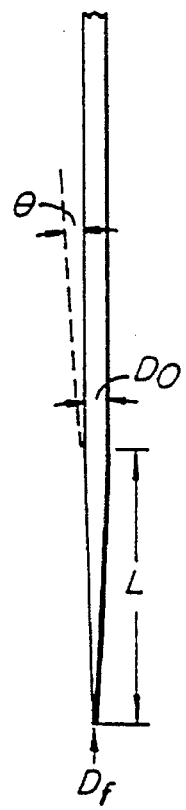
FIG._3.
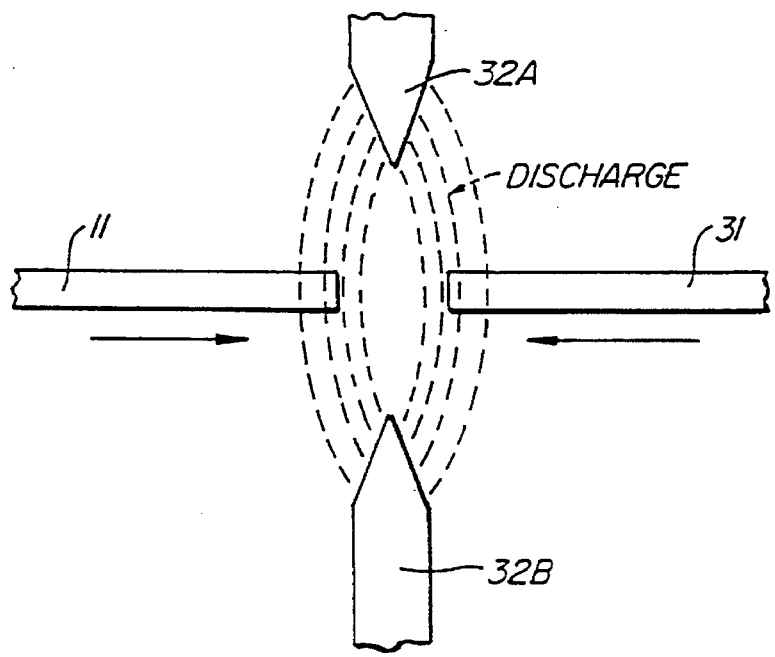
FIG._4A.

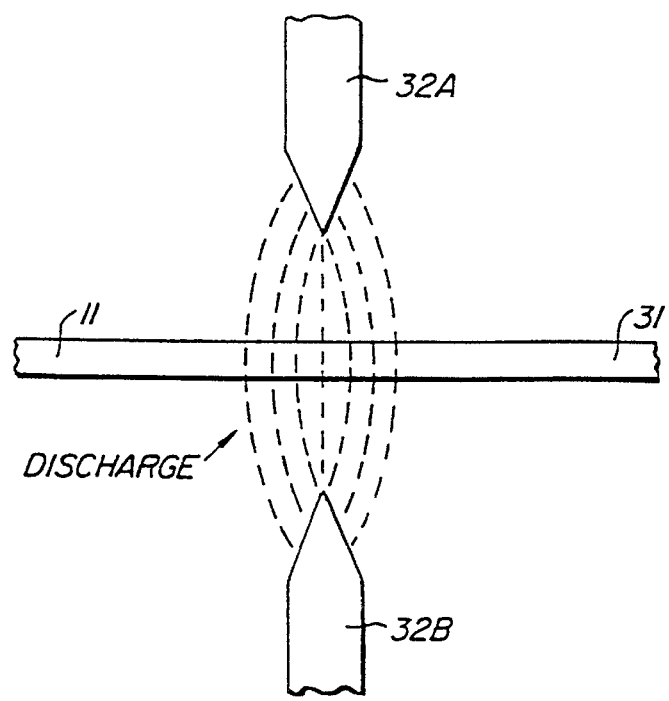
FIG._4B.
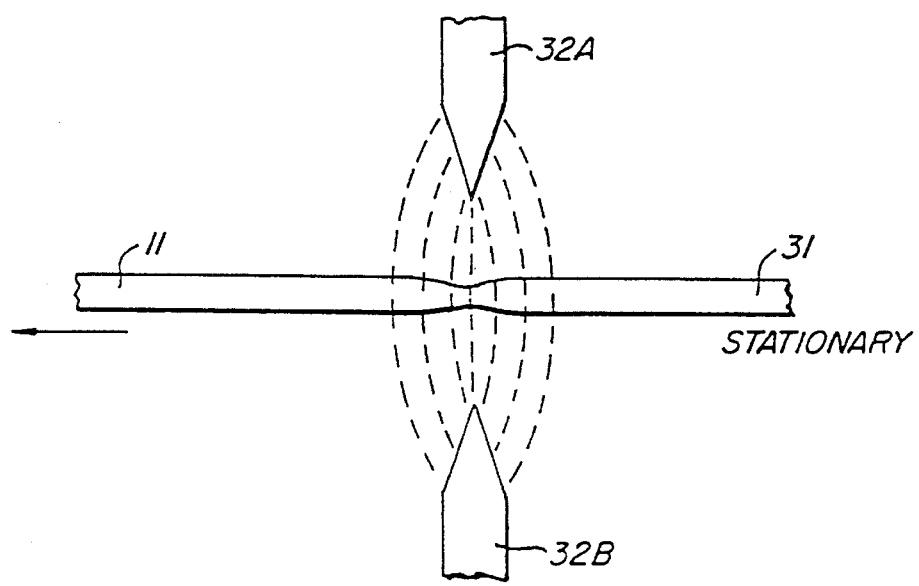
FIG._4C.

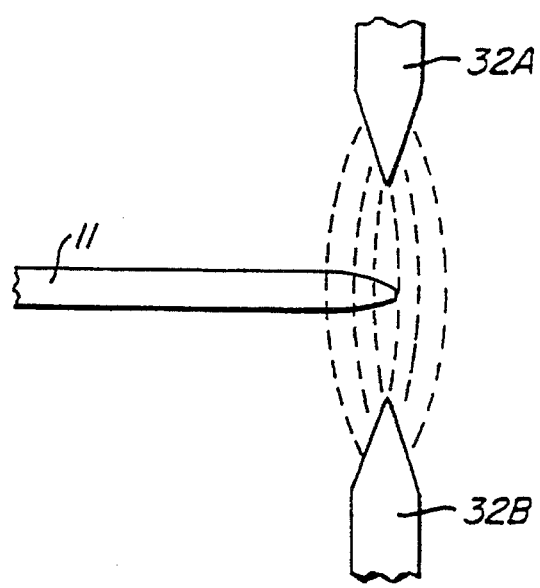
FIG._4D.
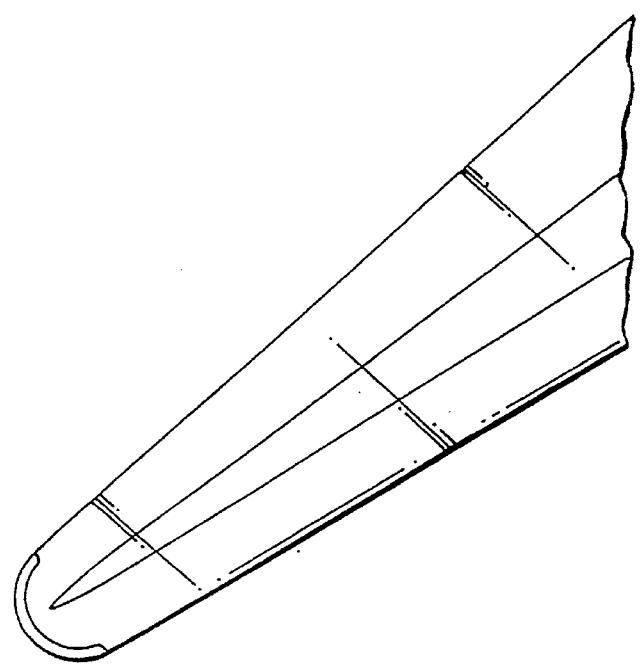
FIG._5.

FIBER OPTIC COUPLER AND METHOD OF MAKING SAME

This invention was made with Government support under Contract Nos. F33615-86-C-1084 and F3315-87-C-1517 awarded by the Department of Defense. The Government may have certain rights in this invention.

This is a Division of application Ser. No. 08/294,666 filed Aug. 23, 1994, now U.S. Pat. No. 3,371,968, which is a Division of application Ser. No. 08/159,882 filed Nov. 30, 1993, now U.S. Pat. No. 3,371,816 which is a Division of application Ser. No. 07/867,651 filed Apr. 13, 1992, which issued as U.S. Pat. No. 5,267,340, which is a Division of application Ser. No. 07/640,176 filed Jan. 11, 1991, which issued as U.S. Pat. No. 5,117,473, which is a Division of application Ser. No. 07/390,795 filed Aug. 8, 1989, which issued as U.S. Pat. No. 5,016,463.

FIELD OF THE INVENTION

The present invention is related to the field of optical fiber technology and, more particularly, to 1×N fiber optic couplers using GRIN lenses.

BACKGROUND OF THE INVENTION

In fiber optic technology light signals are used in place of electrical signals to transmit information from one place to another. In the place of metal wires, transparent optical fibers carry light signals bearing the transmitted information.

One of the desired components in fiber optic technology is a low cost, high-performance coupler by which light signals sent on one optical fiber may be divided or split into light signals on several optical fibers. Conversely light signals on several optical fibers may be combined into one fiber by such a coupler. In the more common electrical technology this is a strightforward matter. Wires may be spliced together to form multiple branches. Electrical signals sent along one wire naturally propagate along all branches connected to the wire; the converse situation is also true.

In fiber optic technology the splitting and combining of the light signals is a much more complicated matter. Connections must be made very carefully to ensure that the intensity-of the light signals are shared equally among the fiber branches and that the loss in intensity is minimized. Furthermore, any resulting phase shifts in the light signals must be accounted for. Hence various schemes for optical splitters have been devised.

Heretofore, integrated optical waveguides on LiNbO$_3$ and glass substates, fused fiber optic star couplers, slab wave guides, active couplers (either acting as combiners or splitters), optical hologram or Fourier transform fiber optic splitters, and GRIN lens fiber optic splitters have been investigated. However, all of these approaches have had deficiencies of performance, such as in excess loss, loss deviation, frequency response, phase preservation and expandability of the splitting ratio, and costs, such as in fabrication of the splitter or interconnection with the rest of a fiber optic network.

For example, previous fiber optic splitters, such as fused splitters, have had splitting ratios of 1:N where N is invariably an even number. Where an odd number of second fibers is desired, the fused splitter wastes the precious energy in the undesired output optic fiber. Another example is that previous GRIN lens fiber optic couplers typically have had a 1:2 splitting ratio and have had difficulty with ratios greater than 1:16.

Thus what is needed is a reliable and low cost fiber optic coupler having a splitting ratio of 1:N where N can be an arbitrary number and where N can be a large number, i.e., greater than 16. The present invention provides for such a fiber optic coupler.

SUMMARY OF THE INVENTION

The present invention provides for a 1×N fiber optic coupler with N being an arbitrary number. In the present invention N can be quite large, far greater than 16.

The coupler has a GRIN lens. At one end of the GRIN lens there is an aligned optical fiber. The tip of the first fiber toward the GRIN lens is formed into a microlens which acts a point source of the light from the first fiber. At the other end of the GRIN lens there is centered a plurality of N second optical fibers, each having a tapered end. The tapered ends are fixed in a bundle which centered against the second end of the GRIN lens. Thus a light signal from the first optical fiber is split into N light signals in the N second optical fibers. Conversely the present invention allows light signals from any of the second fibers to be transmitted into the first fiber. In this manner the light signals from the second optic fibers may be combined in the first optic fiber.

Furthermore, the present invention includes a novel and economic method of manufacturing microlenses at the ends of optic fibers. The present invention also provides for an optic fiber with microlens in combination with a GRIN lens which effectively spreads an optical signal from the fiber out away from its axis in a collimated fashion and a method for forming the combination. The present invention also provides for optical fibers having end sections tapered down to the core at the fiber tip and a method for forming such fibers.

BRIEF DESCRIPTION OF THE DRAWINGS

A better understanding of all aspects of the present invention may be gained by a perusal of the following detailed description with the drawings described immediately below:

FIG. 1 is a general illustration of the fiber optic coupler of the present invention.

FIG. 2 shows the detailed construction of the fiber optic coupler of the present invention in cross-section.

FIG. 3 illustrates in detail the tapered end of the second fibers of the fiber optic coupler of FIG. 2.

FIG. 4A–4D show the steps in manufacturing the microlens at the tip of the first optic fiber in the coupler of FIG. 2 according to the present invention;

FIG. 5 illustrates the completed microlens after the steps shown in FIG. 4A–4D.

DETAILED DESCRIPTION OF THE SPECIFIC EMBODIMENTS

FIG. 1 illustrates the general structure and operation of a 1×N fiber optic coupler according to the present invention. The fiber optic coupler has a first optic fiber 11 fixed to one end of a GRIN (GRaded INdex) lens 10 along the optical axis 12 of the lens 10. At the other end of the lens 10 and also centered about its optical axis 12 is fixed a bundle 14 of N second optic fibers 15.

In operation where the coupler acts as a splitter, light from the first fiber 11 is split and is transmitted along each of the N second fibers 15. The coupler acts as a combiner where first and second fibers switch roles, i.e., light from any one of the N second fibers 15 is transmitted through the GRIN lens 10 to the first fiber 11. The fiber 11 thus combines the signals from the fibers 15; the coupler acts as a combiner.

The details of the optic fiber coupler of the present invention are shown in FIG. 2. While the elements of the drawing are shown in cross-section, it should be understood that the general shape of the elements are tubular or cylindrical in shape unless stated otherwise.

The first optic fiber 11 is coupled to one end of the GRIN lens 10 by means of a first fiber sleeve 13 and tubular GRIN lens holder 18. The GRIN lens 10 is mounted in one end of the holder 18. The sleeve 13 is hollow to receive the first fiber 11 completely through the sleeve 13. The hollow sleeve 13 has a protruding portion which mates with the other end of the holder 18 so that once the sleeve 13 is inserted into the holder 18 the end of the fiber 11 is in very close proximity with the GRIN lens 10 on one side. The fiber 11 is on and aligned with the optical axis 12 of the GRIN lens 10.

The end of the fiber 11 next to the GRIN lens 10 terminates in a microlens. The microlens acts as a point source for the light signals travelling through the fiber 11 to the GRIN lens 10.

On the other side of the GRIN lens 10 there is fixed a bundle 14 of N second optical fibers 15 which receive the light signals from the fiber 11. The bundle 14 is in a ferrule 16 which is, in turn, inserted and fixed to a fiber bundle holder 23. The ferrule 16 and enclosed bundle 14 protrudes from the holder 23.

A hollow precision adapter 21 receives the GRIN lens holder 18 at one end and the protruding ferrule 16 so that the GRIN lens 10 contacts the ends of the bundled second fibers 15 on the side opposite the first fiber 11. The coupling between the holder 18, adapter 23 and ferrule 16 ensures the centering and alignment of the bundle 14 on the optical axis 12 of the GRIN lens 10.

The rest of the fiber optic coupler assembly has a lens jacket 22 which encloses the adapter 21 and the sleeve 13. The lens jacket 22 and fiber bundle holder 23 are inserted and fixed in a stainless steel outer protective jacket 24. A heat-shrunken plastic tube 25 covers the jacket 24. This assembly is shown in FIG. 2.

The particular GRIN lens 10 used in this embodiment of the present invention is a quarter-pitch GRIN lens under the registered trademark "Selfoc" by Nippon Sheet Glass America, Inc. of Clark, N.J. While both standard (SLS) and wide angle (SLW) GRIN lenses have been used with acceptable results, the wide angle lenses have better performance. Furthermore, the GRIN lens are coated with antireflection material, dependent upon the particular wavelength of light to be transmitted, on both sides of the lens. The coating reduces the Fresnel loss at the interfaces between the first fiber and GRIN lens, and the GRIN lens and the second fibers.

The present invention may be used with either single mode or multimode optical fibers. The parameters of the particular optical fibers used have core/cladding diameters of 50/125 microns for multimode fibers and 10/125 microns for single mode fibers respectively. Good sources of such fibers are Corning Glass Works of Corning, N.Y. and AT&T of Atlanta, Ga. Particularly good results have been obtained with multimode fibers using light signals at 0.83 and 1.3 micron wavelengths. Of course, the present invention is effective with optical fibers with different parameters and with light signals at different wavelengths.

The fiber optic coupler is fabricated by first stripping off the protective jacket material of the first fiber 11 to expose the core and cladding at one end section of the fiber 11. Stripping is done by dipping the fiber end section in acetone, which chemically removes the plastic jacket material, or stripping may be done mechanically. Then the fiber is cleaned to remove any residual plastic with either methyl alcohol or 2-propanol.

A microlens is then formed at the tip of the fiber 11. One prior way of making the microlens tip is mechanical. The fiber tip is shaped and polished in a microlens jig, which rotates with respect to the fiber tip. After polishing, the tip of the fiber 11 assumes the shape of the jig.

A more efficient method of making the microlens at the tip of the fiber 11 is provided by the present invention. First, the end of the fiber 11 is cleaved off. In cleaving the fiber 11, it is important that the end of the fiber be as precisely perpendicular to the length of the fiber 11 as possible. Preferably a cleaving jig which can make consistent cleavages of less than 0.5° of absolute perpendicularity is used.

Then a second fiber 31 also has its tip cleaved as perpendicular as possible. As shown in FIG. 4A, the two tips are brought together in the discharge between two electric arc electrodes 32A and 32B. FIG. 4B shows the results, the two tips are fused together. Then the fiber 11 is slowly drawn away from the fiber 31, which is kept stationary. The rate at which the fiber 11 is drawn away from the fiber 31 is determined empirically in conjunction with the strength of the arc discharge between the electrodes 32A, 32B.

The heated end of the fiber 11 becomes thinner the longer the fiber is drawn away from the fiber 31. This is shown in FIG. 4C. Thus the drawing of the fiber 11 determines the diameter and the radius of curvature of the microlens which is to be formed at the tip of the fiber 11. In drawing the fiber 11, the core of the fiber 11 should not twisted. Otherwise, the resulting microlens with its twisted core does not function properly.

When the desired diameter is reached, a quick pull or jerk separates the fiber 11 from the fiber 31. The resulting tip of the fiber 11 is left in the discharge of the electrodes 32A, 32B for a short time to allow the tip round itself under surface tension as shown in FIG. 4D. The tip is then withdrawn from the arc discharge.

At present this method is performed manually on an aligning jig under a viewing microscope. It is possible that some, if not all, of these steps may be automated.

FIG. 5 is an illustration of the resulting microlens formed at the tip of the fiber 11. It has been found that a microlens with a radius of curvature of approximately 10 microns for single mode fibers and approximately 35 microns for multimode fibers works most effectively. These values are for the curvature of the cladding which encloses the core of the fiber as shown in FIG. 5.

Compared to the heat-and-draw method described above, the mechanical method of manufacturing results in a relatively precise and predictable shape for the microlens. But the heat-and-draw method of the present invention is better suited for volume production. Thus the method described above not only lowers the cost of production for the 1×N coupler described herein, but also may lower the production costs of other fiber optic devices, such as fiber optic lasers, optical wave couplers, and optic fibers in microsurgery, for which optic fibers with microlenses are useful.

Returning to the assembly of the 1×N coupler, the fiber end section is fitted into and fixed in the glass or ceramic sleeve 13. The microlens end of the fiber 11 may be inserted through the sleeve 13 and then epoxy placed on the fiber-sleeve joint at the end of the sleeve away from the microlens.

Alternatively, epoxy may be placed in sleeve 13 followed by the insertion of the fiber 11 into the sleeve. The fiber end opposite the microlens is inserted to keep the epoxy from contaminating the microlens and then sleeve 13 is moved along the fiber 11 until the proper position is reached. The curing of the epoxy fixes the fiber 11 in the sleeve 13.

The end section of the fiber 11 is sometimes etched so that the end closely fits into the glass or ceramic sleeve 13. For example, the end section of a slightly oversized multimode fiber (typically having diameters of 125±3 microns) can be reduced by hydroflouric acid (HF) to precisely 125 microns, the inner diameter of the sleeve 13.

Epo-Tek 328 by Epoxy Technology, Inc. of Billerica, Mass., is used as the epoxy. ("Epo-Tek" is a registered trademark of Epoxy Technology, Inc.) This particular epoxy has an index of refraction which is smaller than the index of refraction of the optical fibers and is particularly useful for the fabrication of the coupler. The epoxy also has suitable fluid properties before curing, e.g., viscosity, and sufficient mechanical properties after curing, e.g., hardness, for the fabrication operations.

The sleeve 13 and microlens at the tip of the fiber 11 is then inserted into one end of the tubular lens holder 18. The lens holder 18 mounts the GRIN lens 10 at the other end of the holder 18 and ensures the alignment of the fiber 11 with the optical axis 12 of the GRIN lens 10. It is important that the fiber 11 be aligned properly. Lateral misalignment and especially angular misalignment from the optical axis 12 of the GRIN lens 10 can greatly increase the excess loss of the light signal through the fiber optic coupler.

The microlens at the tip of the fiber 11 is displaced slightly away from the GRIN lens 10. Where the microlens has been formed by the heat-and-draw method, the displacement is typically in a range of 0.010 to 0.015 mm. At this distance the light from the microlens at the tip of the fiber 11 appears to be a point source at the surface of the GRIN lens 10 for practical purposes. An optical signal from the fiber 11 can spread out in the GRIN lens 10 away from its optical axis 12 which is aligned with the axis of the fiber 11. The varying index of refraction of the lens 10 bends the path of the signal back toward the axis 12. When the signal reaches opposite surface of the quarter pitch GRIN lens 10, the signal path is parallel to the axis 12, i.e., the light emerging from the opposite side of the quarter-pitch GRIN lens 10 is collimated. This permits the maximum amount of light to be transmitted to the second fibers 15.

It should be noted that previous combinations of optical fibers and GRIN lens have failed to approach the performances predicted by theory. The combination of an optical fiber with a microlens and a GRIN lens as described above effectively and practically reaches theoretical performances. The present invention permits the realization of not only a practical 1×N coupler but also of functioning devices in diverse fields, such as image processing and photocopying, where previous combinations have been attempted and ended in failure.

In the case where the microlens of the fiber 11 is formed mechanically, the displacement is determined by the shape of the polishing jig. Once the distance for maximum light intensity transmission for one fiber 11 is determined, the displacement distance is set for the other fibers 11.

The bundle 14 of N second optic fibers 15 is fabricated with many of the same techniques used for the fiber 11. The protective jacket at the end section of each fiber 15 is stripped. The exposed core and cladding is then etched into a tapered end section. The taper angle θ of the fiber end section is shown in FIG. 3. In fact $$\theta = \tan^{-1}\{(D_o - D_f)/2L\}$$

where $D_o$ is the cladding diameter, $D_f$ is the smallest diameter of the etched fiber, and L is the length of the taper section. It has been found that with θ in a range of 0.25 to 0.26° for single mode fibers and a range of 0.17 to 0.21° for multimode fibers with L approximately 12–14 mm. (with L typically 12.7 mm.) for both types of fibers, optimum optical performance balanced against manufacturing considerations is achieved. Ideally the fibers 15 should taper down to become as small as possible so that a very large number of fibers can fit into the ferrule 16. However, the fibers 15 must be able to withstand the stress of fabrication so that breakage of the fibers 15 is minimized during the insertion of the tapered fibers 15 into the tapered inner diameter of the stainless steel or glass ferrule 16.

For both types of optic fibers, the fibers 15 are tapered so that the cladding is removed to expose the core at the ends of the fibers 15. As explained below, this reduces the fractional loss in the transmission of light from the GRIN lens 10 to the second fibers 15.

To form the tapered end sections of the fibers 15, a buffered HF solution is used. The solution has a high buffer index to allow repeated use for a fixed exposure time, an advantage of repeatable etching performance. A constant concentration of HF may be maintained by merely adding de-ionized water.

The etching operation is performed by arranging one or more of the fibers 15 vertically and repeatedly dipping the fibers 15 into the buffered HF solution. The repeated dipping action ensures that the tips of the fibers 15 are exposed to the etching solution more than the upper parts of the fiber 15. Hence a taper is formed. The dipping action may be adjusted empirically to attain the desired taper angle θ.

The next step is to insert the tapered end sections of the fibers 15 into the ferrule 16, which has an inner diameter to closely hold the tapered end sections of the N fibers 15. The ferrule 16 inner diameter is determined so that the variation in light intensity received by the second fibers 15 from the GRIN lens 10 is minimized. Theoretically the intensity of light transmitted through the GRIN lens 10 is distributed in a Gaussian envelope centered about the optical axis 12. The inner diameter is large enough to enclose an area about the optical axis 12 so that there is no more than a 3 dB falloff in-light intensity from the maximum at the optical axis 12 of GRIN lens 10. Once the inner diameter of the ferrule 16 is determined, then N, the number of second fibers 15, and the diameter of the tapered ends of the fibers 15 can be easily matched for a close fit by computer-aided design.

It should be noted that the present invention allows the number N to be arbitrary. Thus N can be an odd number, unlike previous couplers/splitters which required N to be an even number for optimal performance. Furthermore, the present invention allows N to be quite large, far greater than 16, the practical limit of many couplers/splitters up to now.

Where N is to be large, about twenty of the tapered fibers 15 are then grouped together for assembly. Epoxy is applied to the end of the etched fiber group. The fiber groups are then assembled together into a bundle 14 of at least N fibers 15 for insertion into the ferrule 16.

Since an optic fiber without its protective jacket is very fragile, the tapered fiber bundle 14 is delicately inserted into the ferrule 16. Filling the ferrule 16 with epoxy before the bundle is inserted helps the operation. The ends of the tapered fibers 15 extend beyond the end of the ferrule 16. The ends of the fibers 15 are cleaved and highly polished in a polishing fixture to ensure the perpendicularity of the fiber ends. The polishing is performed with water with respectively finer and finer polishing papers. Polishing paper from No. 1200 to No. 10,000 are used. At the end of this operation all residual epoxy is removed. Even under a microscope no scratches or dirt should appear.

As mentioned previously, the end sections of each of the second optic fibers 15 are tapered so that the cladding is removed and the core is exposed at the end of the fibers 15. An end view (or from the GRIN lens 10 looking toward the ferrule 16) of the ends of the cleaved and polished fibers 15 has the circular ends of the cores of the fibers 15 touching each other with epoxy in the spaces between the cores. Thus no light is lost into the cladding of a fiber in the transmission of light from the lens 10 to the fibers 15; the fractional loss in the transmission of light from the fiber 11 into each fiber 15 is minimized.

A more subtle benefit from the cladding removal is the "insect eyes" effect, or mutual coupling between the fibers 15, by which light entering one fiber 15 is passed to a neighboring fiber 15 so that the light intensity in each fiber 15 is somewhat averaged. This mutual coupling is enhanced by the epoxy which has an index of refraction smaller than that of the optical fiber core. The mutual coupling is further desirable because the number of effective fibers 15 is increased; i.e., the splitting ratio 1:N becomes greater.

Thus the present invention makes fiber optic couplers with very high splitting ratios and high performance possible. 1×130 couplers with single mode optical fibers have been constructed. With a multimode optical fiber coupler, a splitting ratio of 1×516 have been achieved with an excess coupling loss of −5.99 dB and a loss deviation of 2.5 dB. Thus practical fiber optical couplers of ratios greater than 1×1,000 can be considered to be feasible.

It should be noted that the fibers tapered according to the present invention have uses beyond that of the instant coupler. For example, if the physical relation among a bundle of tapered fibers is maintained, the fibers can be used in image transmission. The small space occupied by the tapered ends permits the fiber bundle to be used as an endoscope in surgery or in mechanical systems.

Thus, while the description above provides a full and complete disclosure of the preferred embodiments of the present invention, various modifications, alternate constructions and equivalents may be employed without departing from the true scope and spirit of the invention. The present invention, therefore, should be limited only by the metes and bounds of the appended claims.

What is claimed is:

1. A method of manufacturing a bundle of optical fibers, each fiber having a cladding and a core, comprising tapering an end section of each optical fiber so that at least the core at the end of said fiber is exposed, aligning the tips of said fibers so that the ends of said fibers are perpendicular to the axis of said optical fiber bundle, and bundling said tapered end sections together with a binding material having an index of refraction less than that of said fiber core, said binding material including epoxy;

wherein said aligning step comprises cleaving the ends of said fibers in said bundle, the remaining end of each of said fibers still having an exposed core; and polishing the tips of said fibers perpendicularly to said axis of said fiber bundle.

2. A method of manufacturing a bundle of optical fibers, each fiber having a core and cladding, comprising tapering an end section of each optical fiber so that at least the core at the end of said fiber is exposed;

inserting said end sections into a ferrule so that the said end sections extend through said ferrule to expose the ends of said fibers;

binding said end sections said tapered end sections together with a material having an index of refraction less than that of said fiber core to form a bundle of tapered end sections of said fibers;

cleaving the ends of said fibers in said bundle, the remaining end of each of said fibers still having an exposed core; and polishing the tips of said fibers perpendicularly to said axis of said fiber bundle.

3. A method of manufacturing a bundle of optical fibers, each fiber having a core and cladding, comprising tapering an end section of each optical fiber so that at least the core at the end of said fiber is exposed;

inserting said end sections into a ferrule so that the said end sections extend through said ferrule to expose the ends of said fibers;

cleaving the ends of said fibers in said bundle, the remaining end of each of said fibers still having an exposed core; and polishing the tips of said fibers perpendicularly to said axis of said fiber bundle.

4. The method as in claim 3 further comprising binding said end sections said tapered end sections together with an epoxy to form a bundle of tapered end sections of said fibers.

5. The method as in claim 4 wherein said epoxy has an index of refraction less than that of said fiber core.

* * * * *